April 21, 1970   C. F. PELLICER ET AL   3,507,011
APPARATUS FOR MANUFACTURING REINFORCED
TUBULAR PLASTICS MATERIAL
Filed Dec. 23, 1967   3 Sheets-Sheet 2

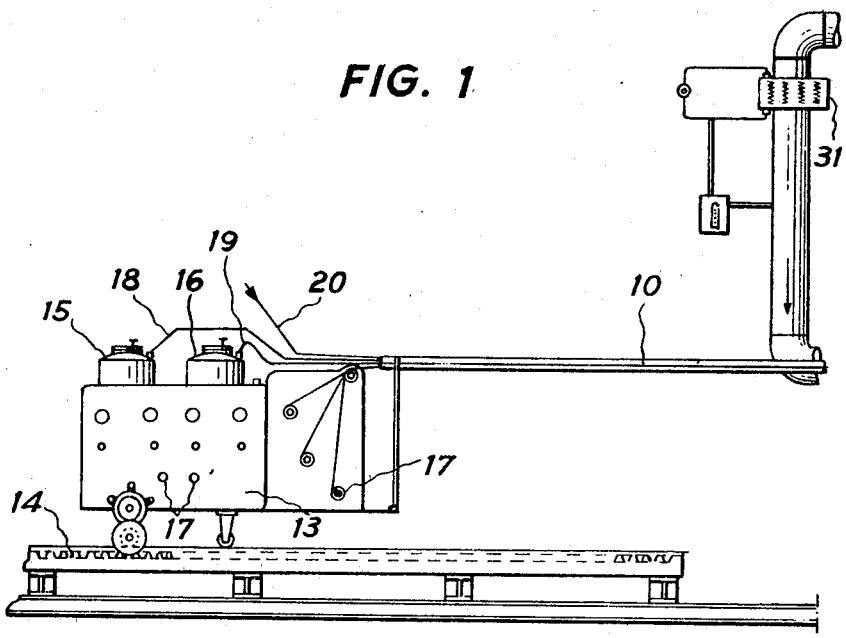
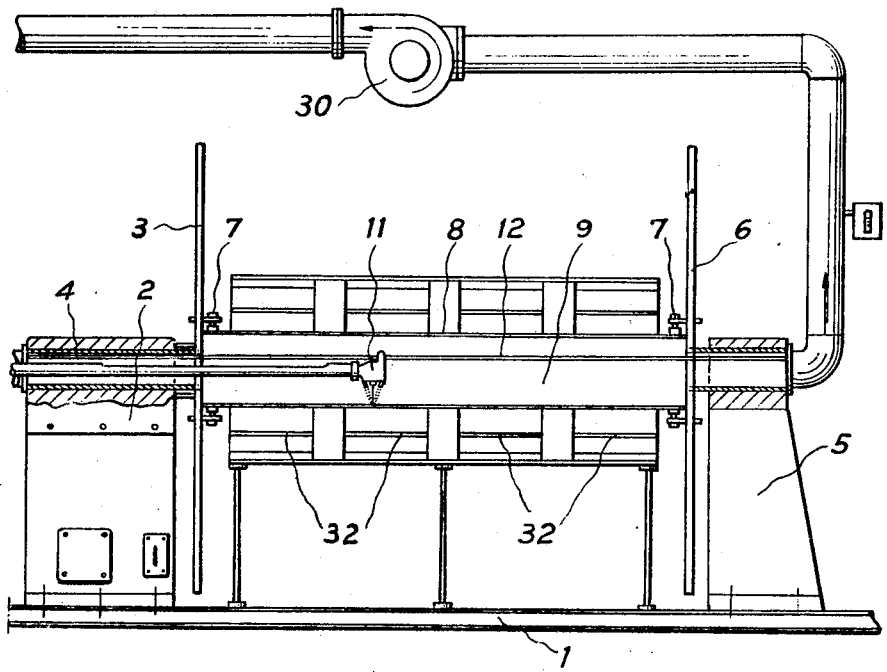

INVENTORS:
CARLOS FRADERA PELLICER
MARIO FRADERA PELLICER by Jacob L. Kollin
ATTORNEY

INVENTORS:
CARLOS FRADERA PELLICER,
MARIO FRADERA PELLICER by Jacob L. Rollin
ATTORNEY United States Patent Office 3,507,011
Patented Apr. 21, 1970

3,507,011
APPARATUS FOR MANUFACTURING REINFORCED TUBULAR PLASTICS MATERIAL
Carlos Fradera Pellicer and Mario Fradera Pellicer, both of Plaza del Conde de Rodezno 11, Pamplona, Spain
Original application Dec. 28, 1964, Ser. No. 421,444. Divided and this application Dec. 23, 1967, Ser. No. 695,828
Claims priority, application Spain, Jan. 9, 1964, 295,520, 295,521; Aug. 7, 1964, 302,905
Int. Cl. B29d 23/08
U.S. Cl. 18—26    3 Claims This invention, which is a division from copending U.S. patent application Ser. No. 421,444, filed Dec. 28, 1964, now abandoned, relates to an apparatus for manufacturing tubular plastics material containing reinforcing elements in the form of chips, fragments of filaments, continuous filaments, made of plastics or other materials.

Various processes have been suggested for the manufacture of reinforced tubular plastics material but all have disadvantages which militate against their use in industry. One common method is to wind a continuous filament, which has previously been impregnated with a polymerisable substance, on to the outside lateral surface of a cylindrical mould, so that when the various convolutions are welded together and the material polymerises, the result is a plastics tube having an reinforcing internal spiral. A serious disadvantage of this method is that contraction of the tube as it cools makes it very difficult to separate the mould.

The process according to this invention enables the finished article to be removed rapidly and readily from the mould, with corresponding advantages in savings of time and labour.

Basically, the novel process resides in hurling the pasty material simultaneously with the reinforcing element on to the inside cylindrical surface of a mould interior, the mould being formed by interconnecting the two halves into which the mould is divided along a central plane. The mould is rotated around its axis so that the hurled material forms a layer over the whole cylindrical surface, the material being retained thereon by centrifugal force and setting and curing by polymerisation. Once the tube has been formed, the two halves of the mould are separated from one another and the tube is removed.

Advantageously, the simultaneous hurling of the plastics and the reinforcing element to cover the whole cylindrical surface can be effected by a spraying device axially movable inside the rotating mould along the whole length thereof. This enables the layer of material to be deposited helically on the mould surface. Alternatively, the spraying device can be stationary and the mould can be adapted to move axially as it rotates.

The reinforcing element can be chips or fragments of one or various filaments which have previously been chopped up before being hurled on to the cylindrical surface together with the plastics. Alternatively, the reinforcing element can take the form of one or more filaments discharged continuously through an aperture disposed at the plastics-spraying device. Alternatively, the plastics can first be applied to continuous filaments which once impregnated are discharged and become disposed helically on the surface of the rotating mould, filaments being retained on such surface by centrifugal force.

Polymerisation of the deposited material can be accelerated by the use of internal and/or external heating at an appropriate temperature.

As will be described, the apparatus enables the process to be carried into practical industrial effect with very good efficiency, economy and quality of work. The apparatus can also be readily adapted to produce tubes of different kinds and dimensions. Basically, the apparatus comprises a wide bed or base having fixedly mounted on it a head associated with a rotating plate, the shaft which drives the same being hollow and being driven by an electric motor through change-speed gearing, a second head being movable lengthwise on the bed and having a freely rotatable plate, so that by appropriate positioning of the second head a cylindrical mould can be mounted, with appropriate clamping or securing means, between the plates of the two heads, mould length being equal to the length of the required tube, the mould being rotated at an appropriate speed, a main supply tube, together with adequate means for axially moving the same along the mould interior, extending through the hollow shaft of the first head, such tube having at its end provision for hurling the polymerisable plastics and the reinforcing element (chopped or continuous filament or glass wool fabric, mat, previously placed in the mould), which element and which plastics, forced along the main tube in independent ducts, are applied to the surface of the rotating mould by centrifugal force to form a layer of material which once polymerised and cured forms the reinforced plastics tube.

The axial displacement of the feed tube must be equal to the length of the required tube being manufactured. For such movement, that end of the tube which is remote from the hurling means is mounted on a moving truck driven by a system comprising an electric motor and a toothed rack and comprising the plastics tanks and having the reinforcing element stored on it; the two materials are forced through the tube by compressed air at a pressure of about 6 atmospheres. When the reinforcing material is in the form of one or several filaments, the reinforcing material is forced through the tube by an air-operated turbine disposed at the hurling device.

The hurling means or device can take the form of a central aperture, for discharging the reinforcing element, and two lateral apertures for separately spraying two plastics preparations which mix with one another and with the expelled reinforcing element in the air to form the paste which will subsequently form the plastics tube. The central aperture can be fed with chopped fragments of filament obtained by the or each continuous filament being chopped up by a bladed roller driven by the compressed-air turbine. The cup can also comprise means for impregnating with plastics a continuous filament which is subsequently introduced into the tube and moved towards the hurling means which in this event is devoid of spraying aperture.

The apparatus can also have fitted to it a hot-air circuit for heating the inside of the mould, to accelerate polymerisation of the material deposited on the mould inside surface. Also, and to the same end, various heating means, such as resistances, infra-red generators and so on, can be disposed outside and around the mould.

In a preferred embodiment, relating to the way in which the tube mould is rotated to enable moulds of different diameters to be used, by a few simple operations the apparatus can be adapted to manufacture tubes of different diameters within a wide range, with a corresponding saving of labour and increase in output. In this improved form, two endless belt systems which bear the tube mould at its ends and which rotate the tube mould are disposed on the heads or frames of the apparatus in order to rotate the mould. Each belt is driven by a driving pulley and guided over a number of rollers or pulleys, some of which are fixedly mounted on the corresponding frame and others of which are disposed on the elements or arms of a deformable articulated system. The same can take up different positions but always stays symmetrical of the longitudinal central plane of the apparatus. The different positions make it possible to vary the path of the belt and adapt such path to different mould diameters to ensure that the same is always driven and therefore rotated.

Preferably, each element of the articulated system is in the form of two parallel twin members having common or pivot spindles. The system is therefore formed by two identical units—one at the front and one at the back—which are symmetrical of a plane normal to the length of the apparatus, the two halves being interconected by the pivot spindles on which the pulleys or rollers are mounted, the same being disposed between the twin members.

Each half of the system comprises two equal arcuate arms disposed symmetrically of the longitudinal central plane. The bottom ends of the arms are pivoted to the frame while the top ends have mounted in them two pulleys which guide the belt and engage the same with the mould. The arms are actuated at their central zone by two articulated rods whose action rotates the arms into the appropriate position for each tube diameter. Each half of the system also comprises a symmetrical assembly formed by four elongated members which are equal in pairs and which are articulated one in continuation of another. The two terminal members are of greater length and are each articulated to the frame at their free end and at the other end are articulated to one end of the respective central member of the assembly. Mounted on each pivot spindle is a pulley which keeps the belt in engagement with the tube mould. The other ends of the two central members are articulated to one another, with a guide pulley mounted on the pivot spindle. The two terminal members of the assembly are operated by articulated rods whose simultaneous action deforms the assembly so that the three pulleys mentioned take up the correct position for every diameter of the tube mould.

An exemplary non-limitative description will now be given of a practical embodiment of the process and various embodiments of the machine, reference being made to the accompanying drawings wherein:

FIGS. 1 and 2 are a front view and rear view, respectively, showing the general arrangement of one embodiment of the apparatus;

Figure 3:
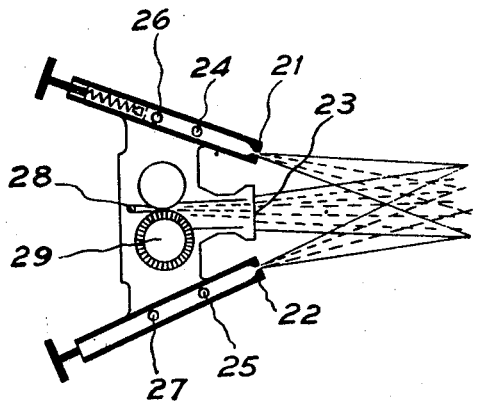
FIG. 3 shows a detail of the projecting device used in cases where the reinforcing element is formed by divided fragments of filament.

Referring to FIGS. 1 to 3, a stationary head 2 comprising a rotating plate 3 is mounted on a base or bed 1. The plate 3 is rotated by a hollow shaft 4 driven by an electric motor through change-speed gearing, so that the speed of rotation of the plate 3 can be varied to suit the characteristics of the particular plastics tube to be manufactured. A plate 6 is mounted for free rotation on another head 5 adapted to move on the bed 1. The head 5 is so positioned that the distance between the plates 3 and 6 corresponds to the length of the tube to be manufactured. A cylindrical mould 8 is secured by clamping elements 7 to the two plates 3, 6 in a position coaxial with the axis of rotation. The mould 8 is formed by two halves which are associated with one another to bound a cylindrical cavity of a length and diameter corresponding to the external diameter and length of the required tube. The mould 8 is rotated by the movement of the plate 3 and is formed by two hemicylinders fitted together along the central plane of division. The mould 8 has a cylindrical hollow interior 9 into which a main feed tube 10 extends through the hollow interior of the shaft 4 and through a corresponding central aperture in the plate 3. The tube 10 has a projecting device 11 fitted to its end in the cavity 9 and, guided by a rod 12, can be displaced from one end of the tube mould to the other. The other end of the tube 10 is mounted on a trolley or truck or the like 13 which can move on rails and which is driven by an electric motor driving a gear wheel in mesh with a toothed rack 14 rigidly secured to the bed 1. Tanks 15, 16 for the plastics compounds and reels 17 of reinforcing filament are mounted on the trolley 13. Air compressed to a pressure of 6 atmospheres is injected through pipes 17 into the tanks 15, 16 to force the plastics compositions through tubes 18, 19 which extend through the main tube 10 to the corresponding aperture of the projecting device.

The reinforcing filaments are unwound from their reels, pulled into the tube 10 and pulled towards the projecting device by a turbine operated by compressed air supplied through a duct 20 and disposed at the projecting device. The same is formed with two lateral spraying apertures 21, 22 and with a central aperture 23 for delivery of the reinforcing material. The plastics compositions, prepared from resin and a solvent and containing the one an appropriate catalyst and the other an accelerating agent, pass through ducts 24, 25 and are sprayed by the streams of compressed air introduced into the ducts 24, 25 through apertures 26, 27. The filaments are fed continuously through a duct 28 and are pulled by an air turbine (not shown) driving a roller 29 having cutter blades which chop up the filament and hurl the same out to be mixed with the sprayed plastics. The plastics are hurled together with the filament fragments over the entire cylindrical surface of the interior of the mould 8. When hurled the two plastics combine with the filamental fragments from the central aperture 23 to form a paste which sticks to the cylindrical surface and is retained by the centrifugal force due to rotation of the mould.

Because of the displacement of the spraying head 2 and because of the rotation of the cylindrical mould 8, the paste is deposited over the entire cylindrical surface the same becoming covered with a uniformly thick layer which is cured by polymerisation to form the required tube. The curing can be either spontaneous or heat-activated by hot air flowing inside the tube, with heat generators being applied to the outside of the mould. For instance, in the apparatus shown in FIGS. 1 and 2 a fan 30 drives an air stream which is heated by resistances 31 is then ducted to the inside of the mould 8. An infra-red heating system 32 is provided outside the mould 8.

Upon the completion of polymerisation the two parts of the mould 8 are separated from one another and the plastics tube is removed.

Several layers of paste can be applied to give the required thickness, the spraying head 2 making various runs in both directions along the axis of the mould interior. The projecting or hurling system can vary to suit the kind of reinforcing element used. If the same is in the form of a continuous filament, the driving turbine is used but the chopping roller is omitted.

Figure 4:
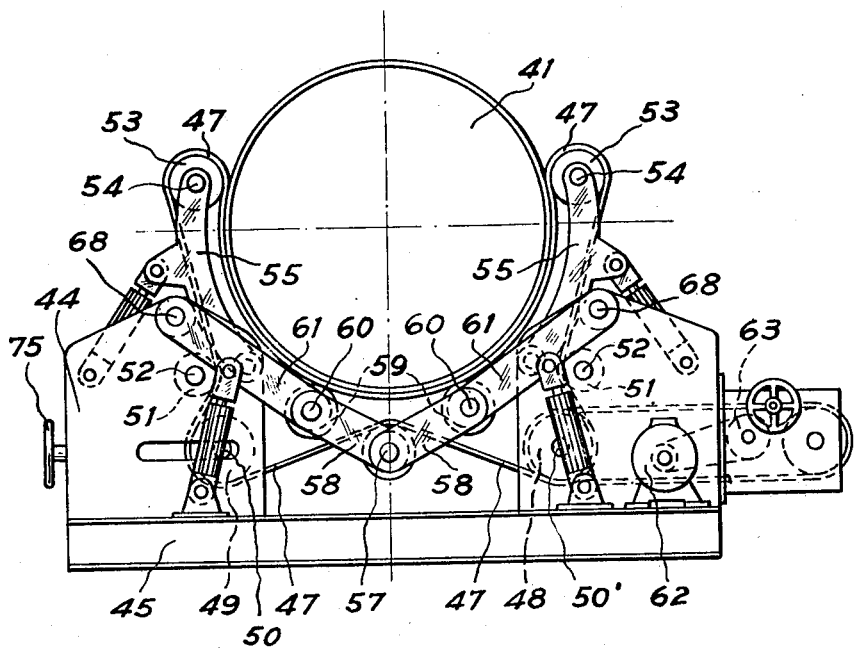
FIG. 4 is a front view of an improved form of the apparatus and shows details of the position taken up by the articulated system when the rotating tube mould is of large diameter.
Figure 5:
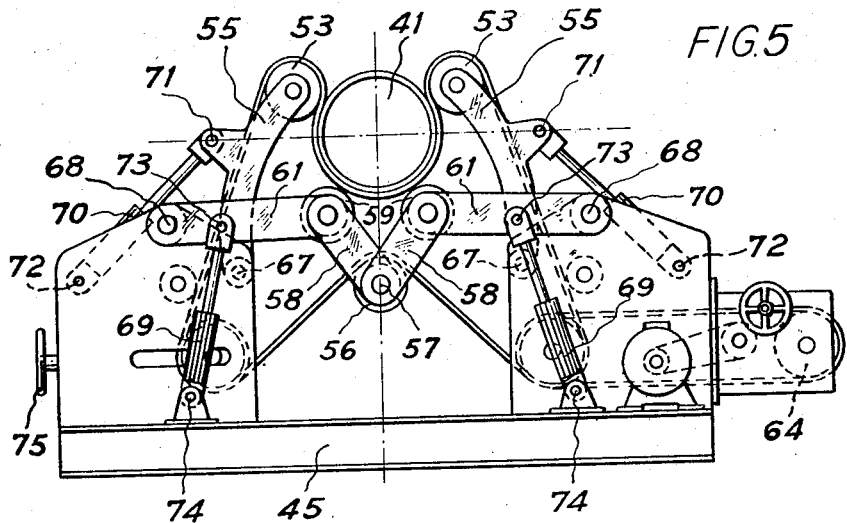
FIG. 5 is another front view of the apparatus shown in FIG. 4 but with the articulated system arranged to rotate a small-diameter mould.
Figure 6:
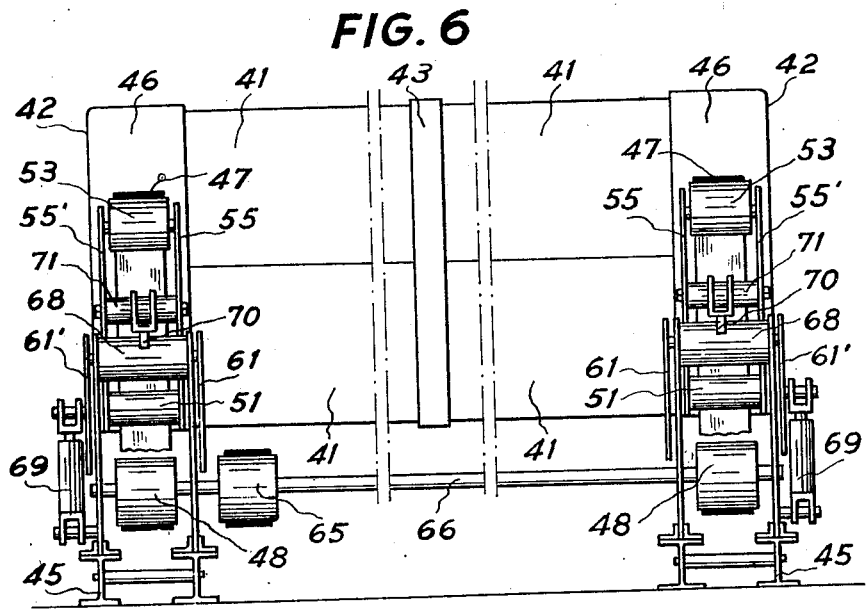
FIG. 6 is a longitudinal view of the same apparatus.

Referring now to FIGS. 4–6, a cylindrical mould 41 is formed by two equal halves which are retained together by the ends of tube thus formed being introduced into retaining collars or rings or the like 42. Intermediate flanges or hoops or the like 43 can also be provided. The end rings 42 are bent at their outer end towards the tube axis to form a flange and leave a central aperture, the main plastics feed tube extending through such aperture at one end of the apparatus. Lateral surface 46 of the ring 42 engages with an endless belt 47 at the corresponding end, the movement of the belt 47 being transmitted to the tube mould to rotate the same around its axis. Each head of the apparatus is formed by a double frame 44 mounted on a base 45. A driving pulley 48 drives the corresponding belt 47, and a pulley 49 on a shaft 50 and two pulleys 51 on spindles 52 guide the belt 47. All the pulleys are fixedly mounted on the frame 44—i.e., they are independent of the deformable articulated system.

Each articulated system comprises two arcuate arms arranged symmetrically of the longitudinal plane, each such arm being formed by twin members 55, 55'. A pulley 53 mounted on a spindle 54 is disposed between the twin members and at the top end of the arm. The bottom end of each of the twin members forming each arm is articulated to the frame by a spindle 67.

The pulleys 53 guide the belt by pressing against the tube mould. Each arm is operated by a rod which is articulated to the spindle 71 and which is rigidly secured to a piston movable in a, for instance, hydraulic cylinder 70. The head of the cylinder is articulated to the frame via a spindle 72. Movement of the piston rotates the arm 55, 55' around its pivot spindle 67 so that the arm can take up various positions to suit the diameter of the mould, as a comparison of FIGS. 4 and 5 will show.

Each deformable system comprises an articulated assembly comprising four elements—two terminal elements 61 and two central elements 58—each comprising twin members, as FIG. 6 shows in respect of the terminal members 61, 61'. At the free end of the terminal elements the twin members forming the same are pivoted to the frame by spindles 68. Pulleys 59 mounted on spindles 60 at the articulation to the central elements of the assembly force the belt against the mould, and a pulley 56 mounted on pivot spindle 57 for the central element helps to guide the belt. All these pulleys or rollers are received between the twin members which make up the elements of the articulated assembly and which are interconnected by the corresponding spindles. The articulated assembly just described can be brought to different positions by actuation of the hydraulic actuators 69 whose rods are connected to spindles 73 mounted between the twin members forming each terminal element. The cylinder heads are articulated to the frame by way of pivot spindles 74. The hydraulic actuators 69, 70 are operated to bring the pulleys 53, 59 into a position such that the belt can adapt itself to the radius of the tube mould to be used and drive the same in rotation. The motor 62 drives through a reducer 63, 64 a pulley 65 moving a longitudinal shaft 66 on which the pulleys 48 for driving the endless belts are mounted. A handwheel 75 enables belt tension to be adjusted by slightly shifting the spindle 50 of the pulley 49.

In some cases the terminal and intermediate elements 42, 43 can be replaced by a tube open at both ends, in which event the mould 41 can be made of a material having less mechanical strength, removal from the mould being effected by the mould being slid axially of the outer tube around it, the two halves which form the mould being separated after the mould has been removed from the tube. Similarly, the ends of the tube or of the terminal rings or the like 42 can, if required, comprise means for inhibiting axial movement of the mould.

What we claim is:

1. A drive and support mechanism for rotating an open or closed cylindrical mold used for producing tubular polymerized plastic material, said mechanism comprising a base, a pair of vertical spaced parallel support frames secured to said base, a driving pulley rotatably mounted on one of said frames, a pair of guide pulleys rotatably mounted on each of said frames, two pairs of arcuate arms disposed symmetrically on each of said frames, respectively, the arms of said pairs pivoted with their ends, to one of said respective frames, the free ends of said arms being provided with tensioning rollers, a deformable link assembly articulated on each of said frames provided with a plurality of guide rollers, a pair of driven endless belts, one of said belts extending over said driving pulley, over the pair of guide pulleys on one of said frames and the guide rollers on the deformable link assembly articulated on said one frame, and over said tensioning rollers, the other of said belts extending over the pair of guide pulleys on the other of said frames and the rotatable guide rollers on the link assembly articulated on said other frame and over said tensioning rollers for frictionally engaging each of said belts with the outer face of a cylindrical mold, and for driving and supporting the mold, and motive means for said driving pulley.

2. The drive and support mechanism as claimed in claim 1, wherein each of said deformable link assemblies comprises a pair of terminal members pivoted with one of their ends to the respective frames, a pair of central members pivoted to each other and to the other ends of said terminal members, each of said members comprising twin elements for receiving said guide rollers.

3. The drive and support mechanism, as claimed in claim 2, further provided with two first pairs of actuators for actuating the respective deformable link assemblies, each of said hydraulic actuators comprising a hydraulic cylinder pivoted to said base and a piston rod pivoted with its free end to a respective terminal member, and two second pairs of actuators pivoted to said respective frames, each of said second pairs of actuators comprising a hydraulic cylinder pivoted to said frame and a piston rod pivoted with its free end to a respective one of said arms, said actuators being operable to tension the rollers of said deformable link assemblies and the rollers of said arcuate arms to thereby tension said endless belts against a cylindrical mold of predetermined size.

References Cited

UNITED STATES PATENTS

| | | |
|---|---|---|
| Re. 25,587 | 2/1964 | Wiltshire. |
| 1,840,027 | 1/1932 | Fetter. |
| 2,252,219 | 8/1941 | Trotzke. |
| 2,870,054 | 1/1959 | Amos et al. |
| 2,962,787 | 12/1960 | Gateau et al. |
| 2,994,919 | 8/1961 | Schafer et al. |
| 3,087,322 | 4/1963 | Mousset. |
| 3,150,219 | 9/1964 | Schmidt _____ 18—26 XR |
| 1,410,705 | 3/1922 | Moody. |
| 1,789,742 | 1/1931 | Halkyard. |
| 2,701,403 | 2/1955 | Chanlund. |
| 3,098,764 | 7/1963 | Kao et al. |

FOREIGN PATENTS

| | | |
|---|---|---|
| 1,199,092 | 12/1959 | France. |

WILLIAM J. STEPHENSON, Primary Examiner